United States Patent
Kirilichin et al.

(10) Patent No.: US 10,940,661 B2
(45) Date of Patent: Mar. 9, 2021

(54) SINGLE PIECE EXPANSION SEALING PLUG

(71) Applicant: Engineered Inserts & Systems, Inc., Watertown, CT (US)

(72) Inventors: Victor Kirilichin, Madison, CT (US); David P. Turechek, Shelton, CT (US)

(73) Assignee: Engineered Inserts & Systems, Inc., Watertown, CT (US)

( * ) Notice: Subject to any disclaimer, the term of this patent is extended or adjusted under 35 U.S.C. 154(b) by 0 days.

(21) Appl. No.: 16/889,228

(22) Filed: Jun. 1, 2020

(65) Prior Publication Data
US 2020/0290305 A1     Sep. 17, 2020

Related U.S. Application Data

(62) Division of application No. 16/508,971, filed on Jul. 11, 2019, now Pat. No. 10,751,967, which is a division of application No. 15/481,117, filed on Apr. 6, 2017, now abandoned.

(51) Int. Cl.
    *B32B 1/00*         (2006.01)
(52) U.S. Cl.
    CPC ........................................ *B32B 1/00* (2013.01)
(58) Field of Classification Search
    CPC ....... B25B 27/00; B25B 27/0014; B32B 1/00; B23P 19/00; F16L 55/00; F16L 55/1108
    See application file for complete search history.

(56) References Cited

U.S. PATENT DOCUMENTS

| 3,139,103 A | 6/1964 | Bottum |
| 3,691,609 A | 9/1972 | Ice, Jr. et al. |
| 3,821,969 A | 7/1974 | Sinko |
| 4,091,841 A | 5/1978 | Beneker et al. |
| 4,301,629 A | 11/1981 | Farr |
| 4,421,137 A | 12/1983 | Nusbaumer et al. |
| 4,462,240 A * | 7/1984 | Yamamoto .......... B25B 27/0014 29/243.524 |
| 4,506,705 A | 3/1985 | Thompson |
| 4,653,540 A | 3/1987 | Epstein |
| 4,712,586 A | 12/1987 | McCauley et al. |
| 4,762,152 A | 8/1988 | Clausen |

(Continued)

OTHER PUBLICATIONS

EIS Engineered inserts and systems inc, EIS-B Blocker/Tapered Sealing Plug, Apr. 4, 2016, http://web.archive.org/web/20160404012312/http://eisinserts.com/eisbblocker.html (Year: 2016).

(Continued)

*Primary Examiner* — Lawrence Averick
(74) *Attorney, Agent, or Firm* — St. Onge Steward Johnston & Reens, LLC

(57) ABSTRACT

A single piece expansion plug and method of using the same in connection with a tool is provided. The plug has an inner recess extending partially into a top of the plug, the inner recess defining a tapered inner wall. The plug is installed with a tool having a tapered end at a greater angle with respect to the taper inner wall. The tool presses against the tapered inner wall to expand the plug against a hole. The tool includes a pin that retracts against a spring to seat the plug in the hole to be sealed such that the pin contacts the plug prior to the tapered inner wall and tapered end coming into contact.

17 Claims, 6 Drawing Sheets

(56) References Cited

U.S. PATENT DOCUMENTS

| | | | |
|---|---|---|---|
| 4,768,560 | A | 9/1988 | Logsdon |
| 5,195,588 | A | 3/1993 | Dave |
| 5,289,851 | A | 3/1994 | Jorgensen |
| 5,779,085 | A | 7/1998 | Havlinek et al. |
| 7,516,534 | B2 | 4/2009 | Easterbrook et al. |
| 8,556,102 | B2 | 10/2013 | Hersant et al. |
| 9,194,527 | B2 | 11/2015 | Larsson |
| 9,416,907 | B2 | 8/2016 | Jaoui et al. |
| 2008/0314902 | A1 | 12/2008 | Dayton et al. |
| 2013/0241159 | A1 | 9/2013 | Mateo |
| 2015/0122363 | A1 | 5/2015 | Larsson |
| 2015/0202754 | A1 | 7/2015 | Kirilichin et al. |

OTHER PUBLICATIONS

Lee Betaplugs—Short Series Betaplug Retrieved Jan. 16, 2017 from URL: http://www.leeimh.com/metal/betaplug-expansion-plugs/Installation-ShortSeriesBP.htm 2 pages. © 2017. All Rights Reserved. The Lee Company.

* cited by examiner

SINGLE PIECE EXPANSION SEALING PLUG

FIELD OF THE INVENTION

The following relates to sealing plugs for holes and passageways. More particularly, the following relates to a single piece expansion sealing plug.

BACKGROUND OF THE INVENTION

There are numerous types of plugs available that seal holes. Oftentimes, holes are made in parts for the purposes of connecting other holes together to create internal passageways for fluids. In some cases, holes are made to access internal components that later need to be sealed. A number of solutions are available in multi piece plugs such as ball expansion plugs. These ball expansion plugs involve a cylindrical piece with a cylindrical relief cut out from the inside thereof. A ball is press fit into this cylindrical relief to hold the two together. The assembly is placed in a hole that has a two step diameter such that one end of the cylindrical piece inserts into the hole and stops where the diameter steps down. A hammer, such as a pneumatic hammer is then used to further press the ball into the cylindrical piece and thereby expand the cylindrical piece outwardly to seal the hole. While these are types of plugs work very effectively, they suffer a downside in that two pieces are required to be machined and assembled. This adds expense and complexity. Further, the step down installation hole involves two steps for creation thereof.

Other types of expansion plugs are disclosed in US Pat. Pub. No. 2015/0202754. This type of plug involves a hollow cylinder and an internal tapered piece that is fit to the cylinder. A tool attaches to the internal tapered piece and pulls that piece into the cylinder to expand the cylinder against the hole. This style of plug provides a number of benefits, but is still a two piece plug that may not be suitable for certain applications.

Although simple plugs that do not expand might be capable of being forced into a hole to seal it, the problem is that as such a plug is forced in, it could scratch the sides of the hole and provide a leakage pathway, thus reducing the ability of such a plug to resist elevated pressures.

SUMMARY OF THE INVENTION

It is therefore an object of the invention to provide a single piece expansion plug that is both cost effective and simple to install.

A further object is to provide a single piece expansion plug that seals a tapered hole.

Still a further object is to provide a single piece expansion plug that is capable of withstanding elevated pressures and resisting blow out.

Yet another object is to provide an installation tool and method of installing a single piece expansion plug that is both reliable and repeatable.

These and other objects are achieved by providing a single piece expansion plug and method of using the same in connection with a tool is provided. The plug has an inner recess extending partially into a top of the plug, the inner recess defining a tapered inner wall. The plug is installed with a tool having a tapered end at a greater angle with respect to the taper inner wall. The tool presses against the tapered inner wall to expand the plug against a hole. The tool includes a pin that retracts against a spring to seat the plug in the hole to be sealed such that the pin contacts the plug prior to the tapered inner wall and tapered end coming into contact.

Other objects are achieved by providing a single piece expansion plug with an external tapered wall and a recess in the top of the plug. The external tapered wall at the recess is configured to expand outwardly against an installation hole to seal said hole. The expansion is accomplished through use of a tool with a spring loaded pin that contacts the plug to seat the plug in the hole and retracts to allow an outer tapered end part of the tool contact the plug at the recess to expand the plug against the hole.

In one aspect a kit is provided for sealing a hole. The kit includes a plug and a tool. The plug includes a single piece unitary body with a bottom and a top and a side wall disposed therebetween. The side wall is outwardly tapered from the bottom towards the top at a first angle. A recess is located in the top and extends partially into the body and terminates at a recess base between the top and bottom. An inner wall is defined by the recess and tapers outwardly from the recess base towards the top at a second angle. The installation tool includes a tapered end section located at a distal end of the installation tool, the tapered end section tapering inwardly at a third angle that is greater than the second angle. A pin is located in a channel extending into the tool from the distal end. The pin is configured to move along a central axis of the tool such that in an extended position, the pin extends beyond the distal end.

The plug may include a protrusion extending from the recess thereof. The protrusion includes a central void therein, the protrusion and central void are aligned along a central axis of the plug. The tool includes a central void at the distal end with a diameter such that the protrusion fits into the central void. In some cases the first, second and third angles are all different. In other aspects ribs are located on the side wall between the top and the recess base.

In other aspects a plug is provided which includes a single piece unitary body with a bottom and a top and a side wall disposed therebetween. The side wall is outwardly tapered from the bottom towards the top at a first angle. A recess is located in the top and extends partially into the body and terminates at a recess base between the top and bottom, An inner wall is defined by the recess and tapers outwardly from the recess base towards the top at a second angle.

In certain aspects a central recess is located at a central axis of the single piece unitary body within the recess. In other cases, a protrusion extends from the recess base and the central recess is located within the protrusion. In other aspects, the body is symmetrical around a central axis thereof. In other aspects a plurality of ribs extend around the circumference of the side wall and extending outwardly such that each one of the ribs is separated from the others of the ribs. In certain aspects two of the ribs are positioned on the sidewall at a distance from the top that is less than a distance between the top and the recess base. In certain aspects, the second angle is at least 1.5 times the first angle. In other aspects, the first angle is 1-7 degrees and the second angle is 5-15 degrees.

In other aspects, a method is provided for sealing a hole including the steps of: providing a tapered hole; inserting a plug into the tapered hole, the plug having a single piece unitary body with a bottom and a top and a side wall disposed therebetween, a recess located in the top extends partially into the body, the recess defining an inner wall of the plug; aligning an installation tool with the tapered hole and the plug; moving the installation tool axially towards the hole such that an end section of the installation tool presses on the inner wall to expand the plug outwardly towards the tapered hole.

In certain aspects, a pin is located in a central void of a distal end of the installation tool, an end of the pin configured to move along an central axis of the tool such that in an extended position, the pin extends beyond the distal end and said pin retracts towards the distal end as the end section of the installation tool expands the plug outwardly. In other aspects, movement of the pin is resisted by a spring of the installation tool and an installation force for the plug is at least 50 times a total spring force measured at maximum displacement of the pin during installation of the plug.

In other aspects movement of the pin is resisted by a spring of the installation tool and a first force is at least twice a second force. The first force is exerted by the pin against the plug during the moving step when the end section first makes contact with the inner wall; and the second force is exerted by the pin against the plug at a maximum displacement of the pin.

In other aspects, movement of the pin is resisted by a spring of the installation tool having a spring rate measured as force/inch, wherein the force in pounds of the spring rate is less than 10% of an installation force in pounds exerted against the plug.

In other aspects, a tool is provided for installing a plug which seals a hole. The tool includes a proximal end and a distal end, the proximal end being thicker than the distal end. A pin is located in an interior channel and aligned with a central axis of the tool. The interior channel extends to the distal end. The pin is connected to a spring. The pin; in an extended position protrudes from the distal end at a distance. The pin is configured to retract within the channel with resistance from the spring. An end section of the tool is located at the distal end and has an inward taper in a direction from the proximal towards the distal end. An inner diameter is located where the channel and distal end meet. The inner diameter is greater than a diameter of the pin such that a space exists between the pin and the distal end.

In other aspects the channel includes female threads and the pin is held in the channel by a threaded member with male threads accessible from the proximal end of said tool. In some aspects the male and female threads are held in a fixed position by a thread locking compound.

Other objects of the invention and its particular features and advantages will become more apparent from consideration of the following drawings and accompanying detailed description.

DETAILED DESCRIPTION OF THE INVENTION

Figure 1:
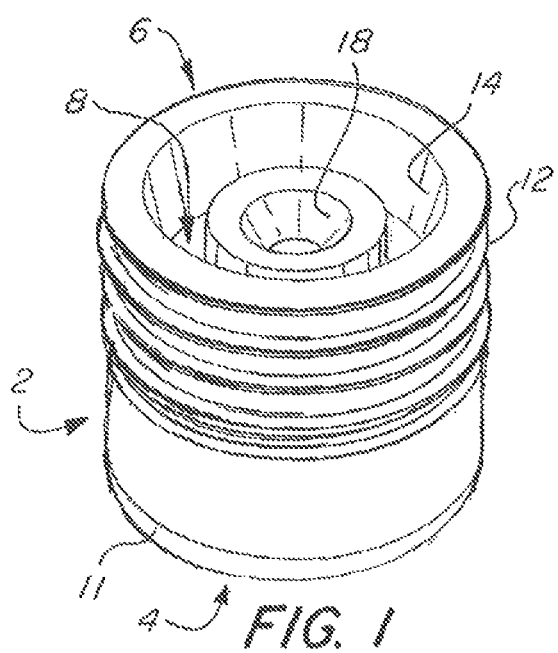
FIG. 1 is a perspective view of a plug according to the present invention.
Figure 2:
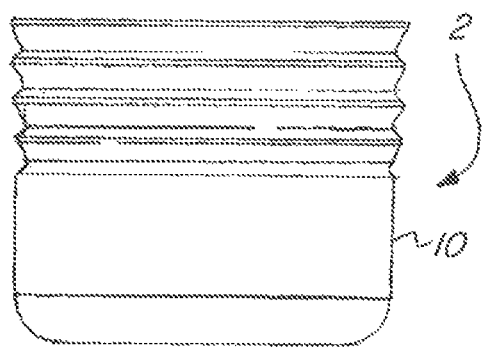
FIG. 2 is a side view of FIG. 1
Figure 3:
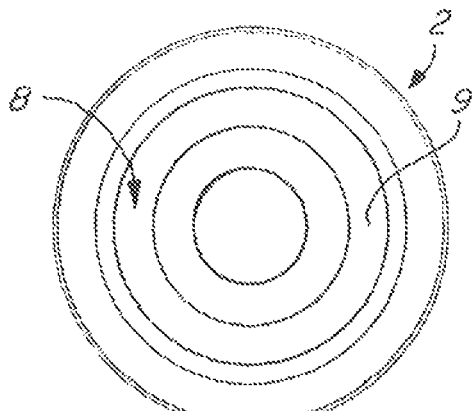
FIG. 3 is top view of FIG. 1
Figure 4:
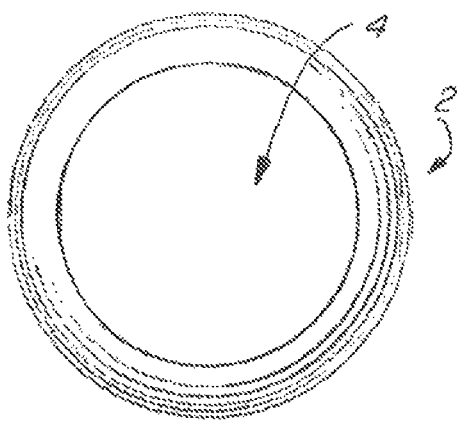
FIG. 4 is bottom view of FIG. 1
Figure 5:
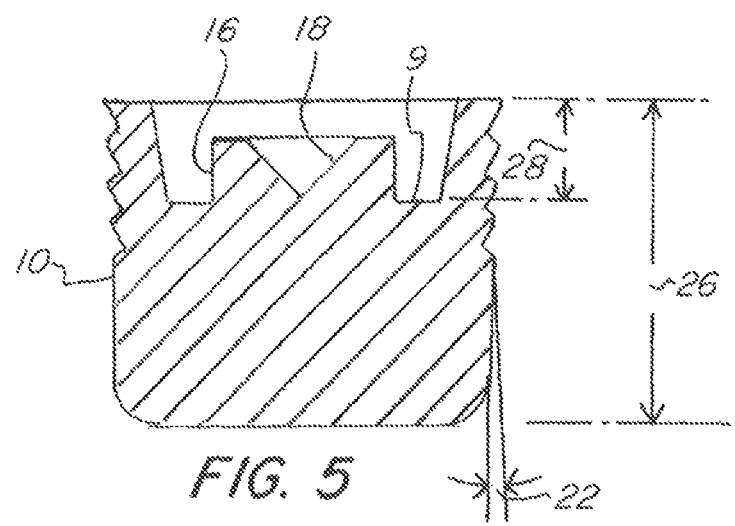
FIG. 5 is a sectional view of FIG. 1
Figure 6:
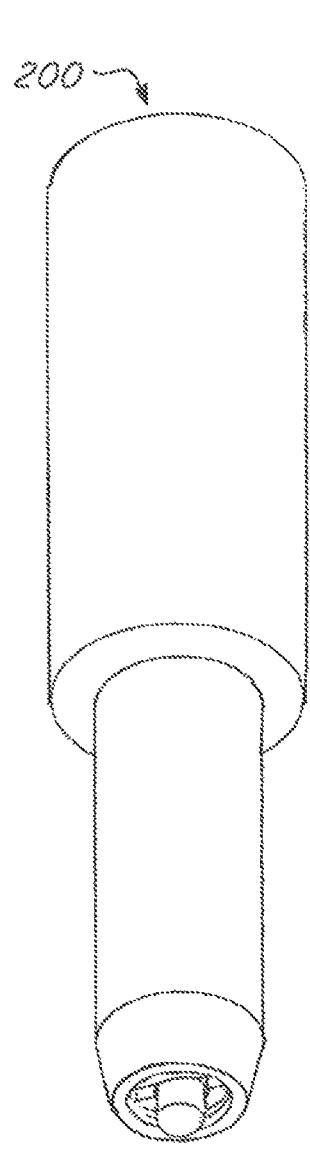
FIG. 6 shows the tool for installing the plug of FIG. 1
Figure 7:
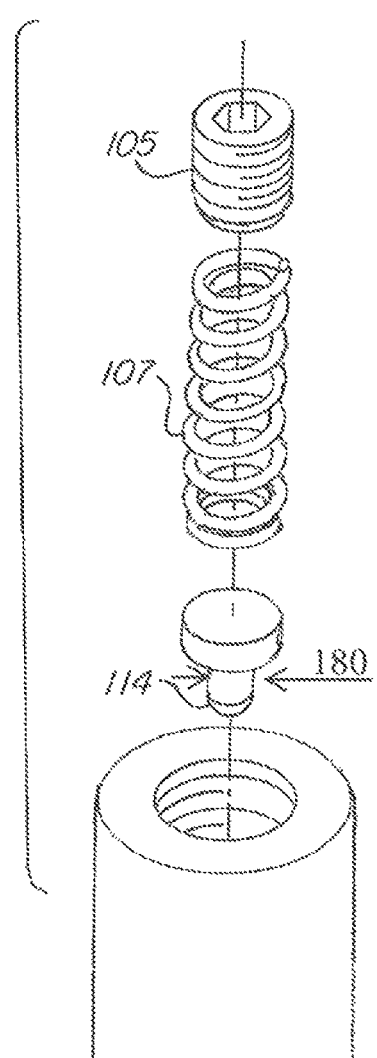
FIG. 7 shows an exploded view of the tool for installing the plug of FIG. 1
Figure 7:
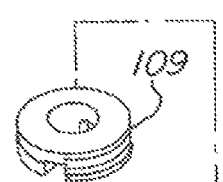
Figure 8:
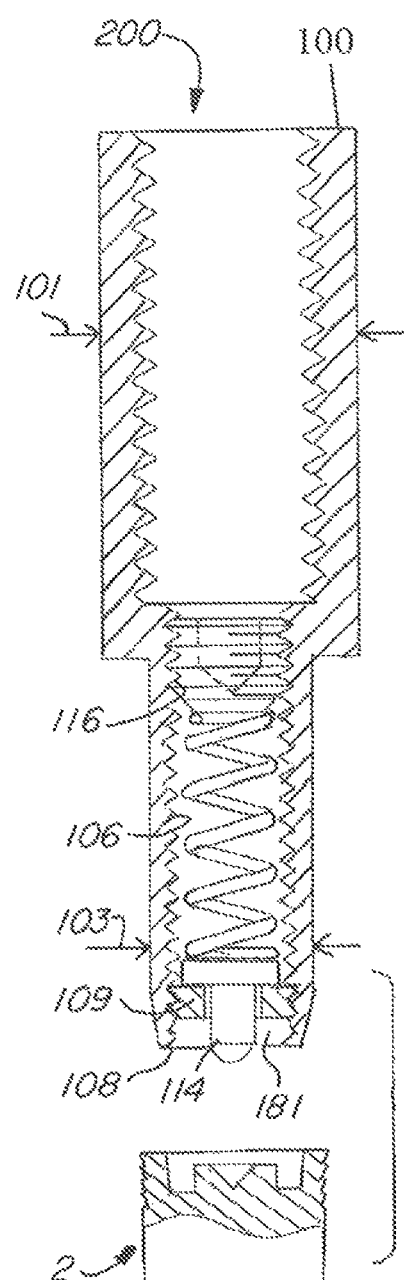
FIG. 8 shows a sectional view of the tool and plug of FIG. 1.
Figure 9:
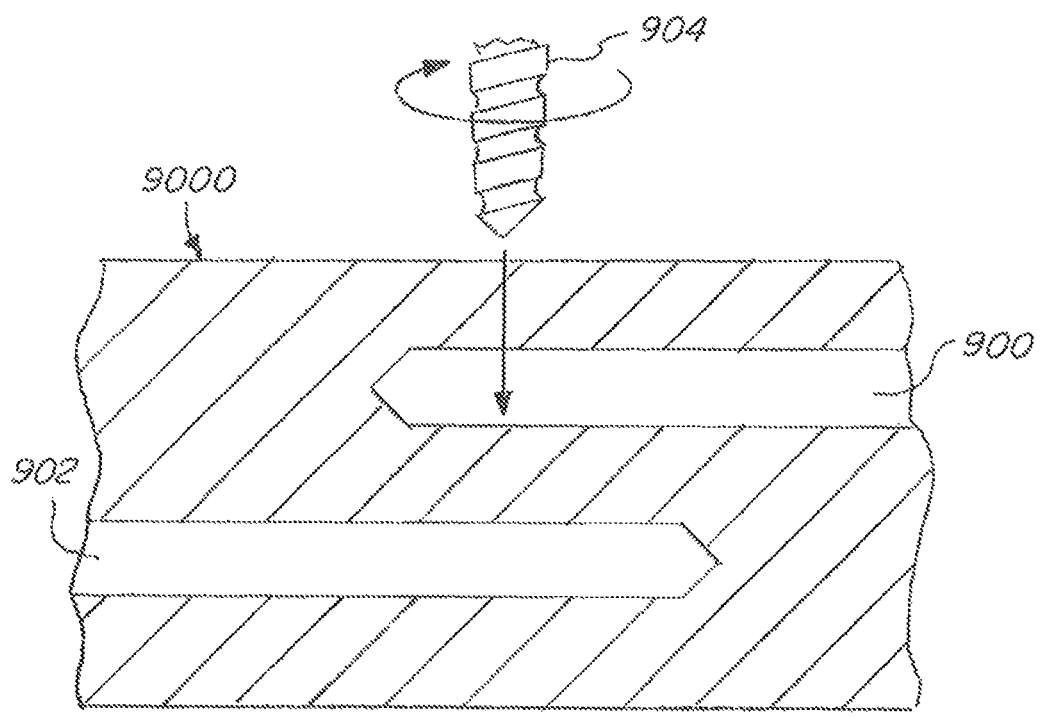
FIGS. 9-16 show the process of installing the plug of FIG. 1
Figure 10:
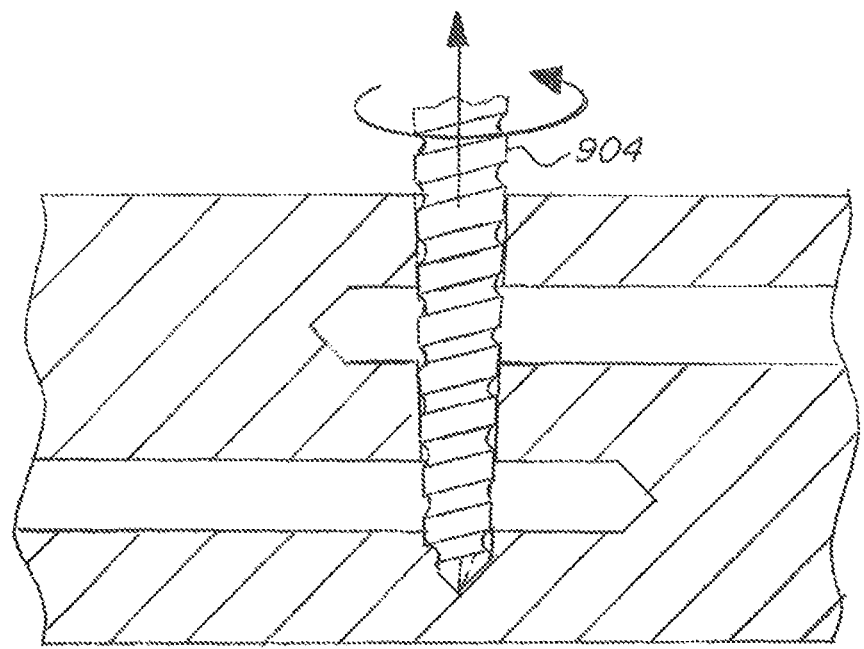
Figure 11:
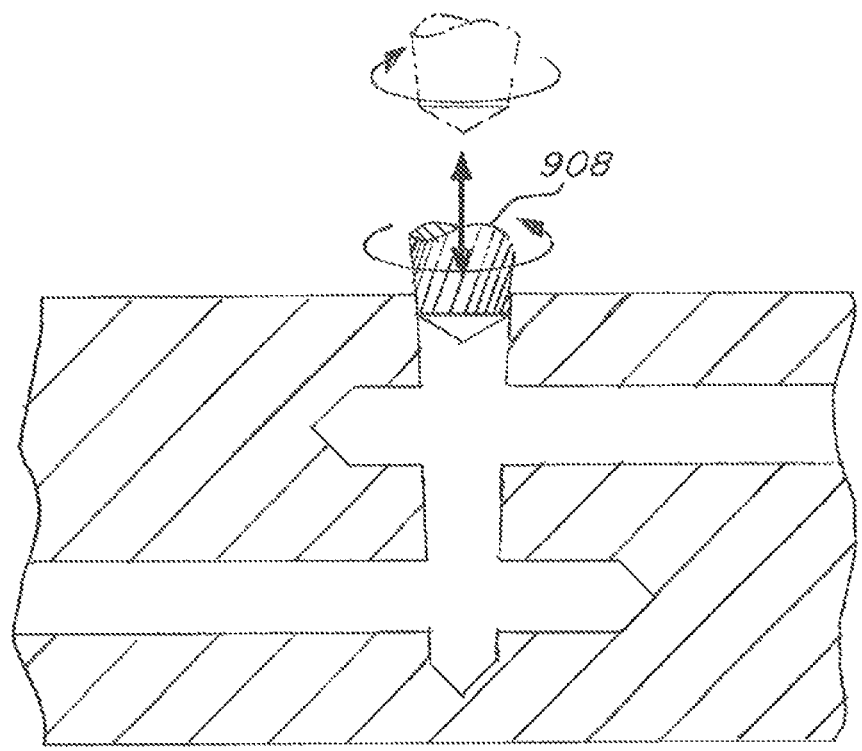
Figure 12:
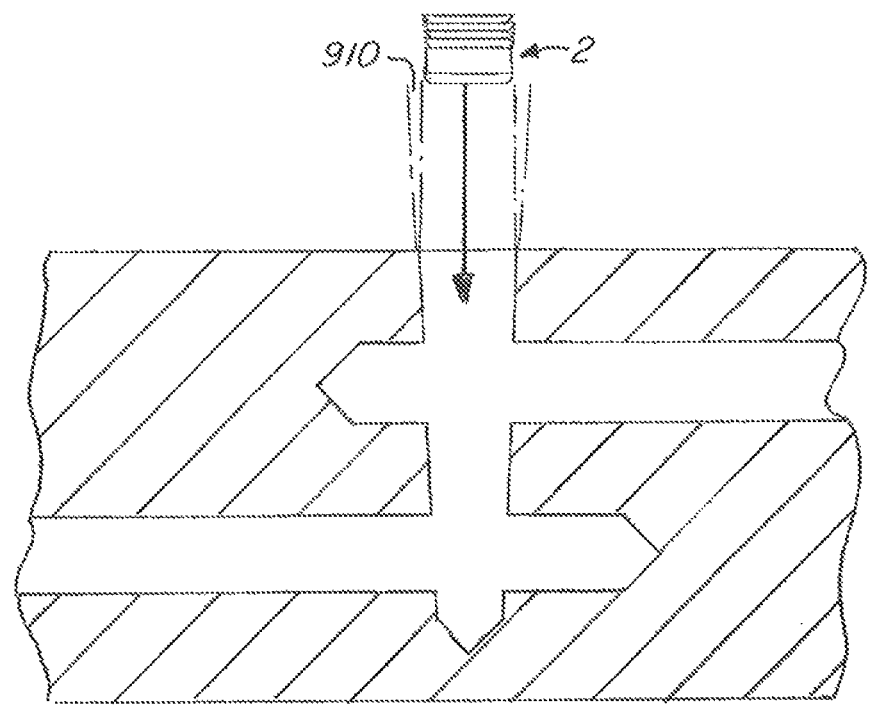
Figure 13:
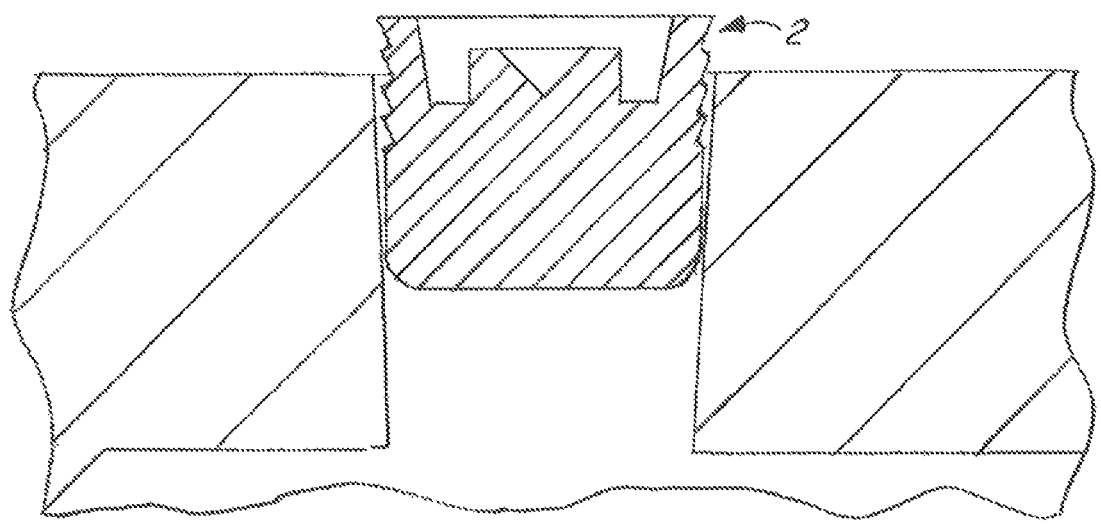
Figure 14:
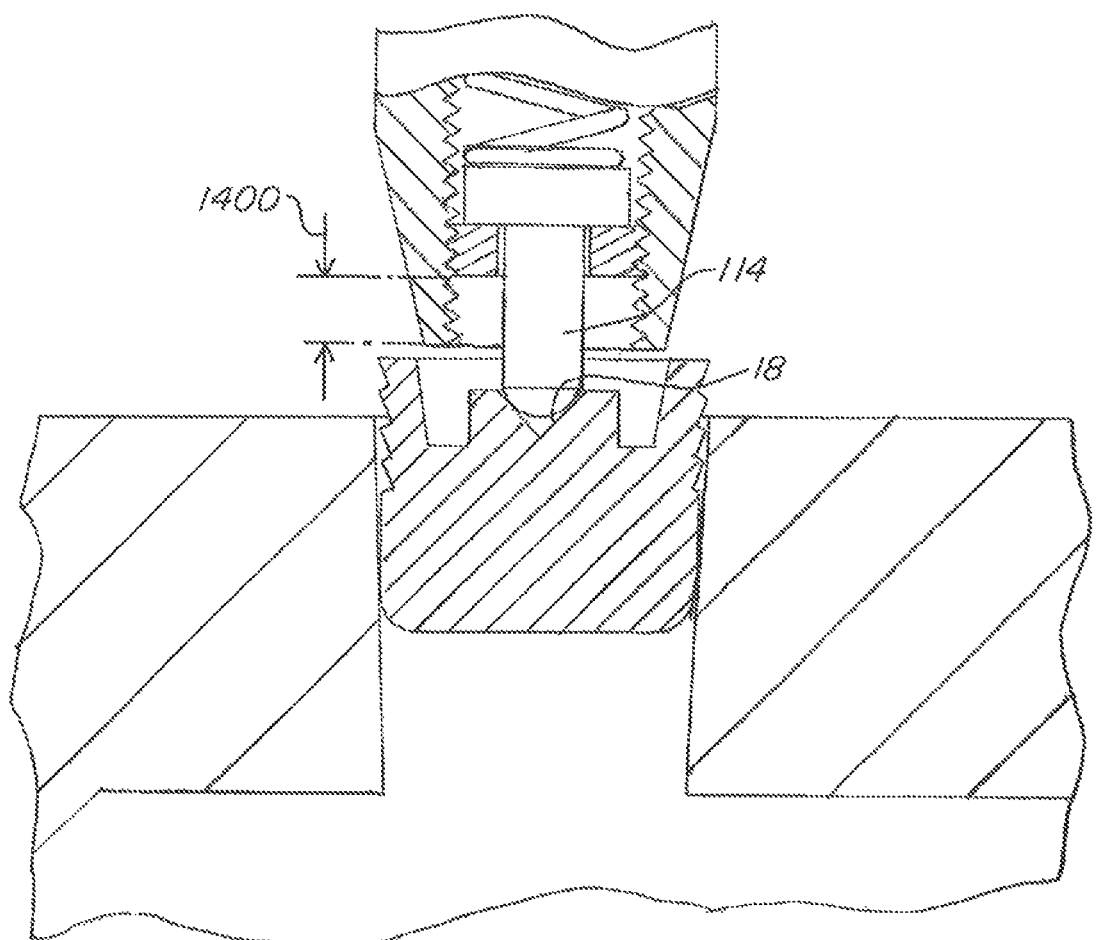

Referring now to the drawings, wherein like reference numerals designate corresponding structure throughout the views. The following examples are presented to further illustrate and explain the present invention and should not be taken as limiting in any regard.

The plug 2 includes bottom 4 and top 6 ends. As can be seen, the plug is unitary and made of a single piece. In one example, the plug might be machined from a solid piece of metal. Other manufacturing techniques may be used to create the plug for example stamping as well as sintering, casting or other manufacturing techniques that would be apparent to those skilled in the art.

A side wall 10 extends between the bottom 4 and top 6 ends. The side wall is tapered. In one aspect, the taper angle matches that of the hole where the plug is to be installed. In one embodiment, the taper angle 22 of the side wall 10 is 0.075 MM taper/MM. As can be seen, where the side wall 10 and the bottom 4 meet, the edge 11 is rounded.

The top 6 includes a recess 8 therein. The recess defines an inner side wall 14 that is tapered inwardly from the top 6 towards the recess base 9. The taper angle 22 generally ranges from 5-15 degrees. In the example shown, the recess base is a flat ring shaped surface. Ribs 12 are located on the part of the side wall opposite the inner side wall 14. As shown, three of these ribs are located between the top 6 and the recess base 9 and one of the ribs is located between the recess base 9 and the bottom 4. Additional or fewer ribs can be used, depending on the sealing characteristics desired. However, in most implementations, there will be one or more ribs 12 located between the top 6 and the recess base 9, typically so that when expanded outwardly, the ribs are located on section of the plug between the inner side wall 14 and the side wall 10 that is primarily deformed radially outwards. The depth 28 of the recess 8 is defined from the top 6 to the recess base 9. This depth 28 is in the range of 15-45% of the height 26 of the insert. More particularly, the depth 28 is 20-40% of the height 26, or more particularly 25-35% or even more particularly 28-33%.

Within the recess 8 a central recess 18 is located on a protrusion 16 that extends from the recess base 9. The central recess 18 is located along the central axis 20 of the plug 2. This central recess 18 is used to contact the pin of the installation tool to help seat the insert with the appropriate force prior to expansion.

Referring now to the tool 200, the proximal end 100 of the tool 200 body has a diameter 101 and is configured to be held and manipulated by a press. For example, the tool 200 may be placed into a chuck that holds the tool, the chuck connected to a drive motor which moves the tool to install the plug 2. The distal end 102 of the tool 200 has a diameter 103 that is smaller than the proximal end 100. A channel in the tool has a stop 105 which is configured as a hollow threaded bolt with male threads 118. The hollow end holds the pin 104 and spring 107. The channel 106 of the end 102 includes female threads 116 which correspond to the male threads 118. In one aspect, the stop 105 includes a hex key end that enables the spring tension to be adjusted. On the opposite end of the spring is a stop nut 109 which threads into the end of the tool to adjust the distance which the pin extends from the end part 108. In most cases, a thread locking compound such as Loctite® or other suitable compound is used to hold the stop 105 relative to the channel 106 during the press installation operations.

The diameter 180 of the pin 114 is less than the diameter 112 of the channel at the distal end 102, this creates a space 181 between the pin and the distal end. During installation, the protrusion 16 which contains the central recess 18 on the plug 2 fits within this space to allow the distal end and the tapered end part 108 to contact the inner wall 14 and extend into the recess 8.

FIGS. 9-15 show an exemplary process of installing the plug 2 in a hole. First, a block 9000 is provided, typically with two passageways 900, 902 that are to be connected. A tapered drill 904 creates a hole in the block, which connects the two passageways 900, 902. A deburring device 908 finishes the top of the hole and the plug 2 is placed therein. The taper 910 of the hole matches the taper 22 of the plug 2. The tool then presses on the plug 2 such that pin 114 contacts the central recess 18. The spring action of the pin 114 allows the pin to retract as the tool presses the plug 2 into the appropriate location in the hole. As the tapered end of the end part 108 contacts the wall 14 of the plug 2, the plug is expanded outwards and the ribs are pressed into the hole in the block. The spring force of the pin 114 provides enough force to place the plug 2 in the appropriate position while avoiding excessive scratching of the hole. Such scratches could become leak pathways, which is prevalent in many other non-expansion type plugs. The expansion action of the plug as expanded by the tapered end of the tool reduces or eliminates the need to force the plug down into the tapered hole in the block 9000 and instead, outward expansion is obtained to provide improved sealing. The forces used to provide the appropriate downward pressure as related to the overall installation force are therefore important for reducing the scratch/drag marks on the hole while providing effective sealing. In one example of a 7 mm size plug (7.01 mm diameter), the total downward installation force is 800 pounds force with the spring travel 1500 being 0.125 inches. The spring force where end 108 first contacts the wall 14 is 3.0 pounds and defines the contact travel of the spring. The total force upon the 0.125 inch travel is 11.0 pounds. The spring rate is 56.0 pounds/inch. It is understood that these are exemplary figures which may be adjusted, particularly depending on the size and material of the plug and/or block. Further, the stop nut 109 is positioned such that it does not contact the plug at the end of the installation stroke shown at FIG. 15. Particularly, distance 1400 is greater than the height of the protrusion 16.

Figure 15:
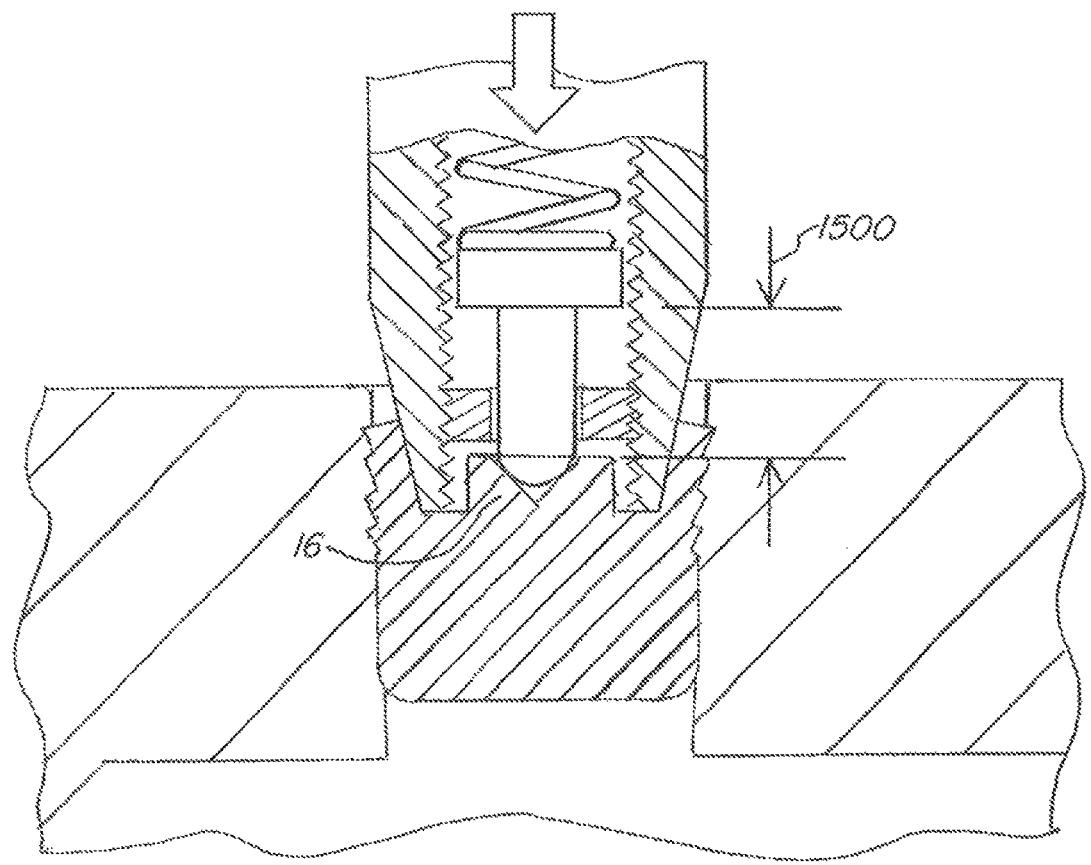
Figure 16:
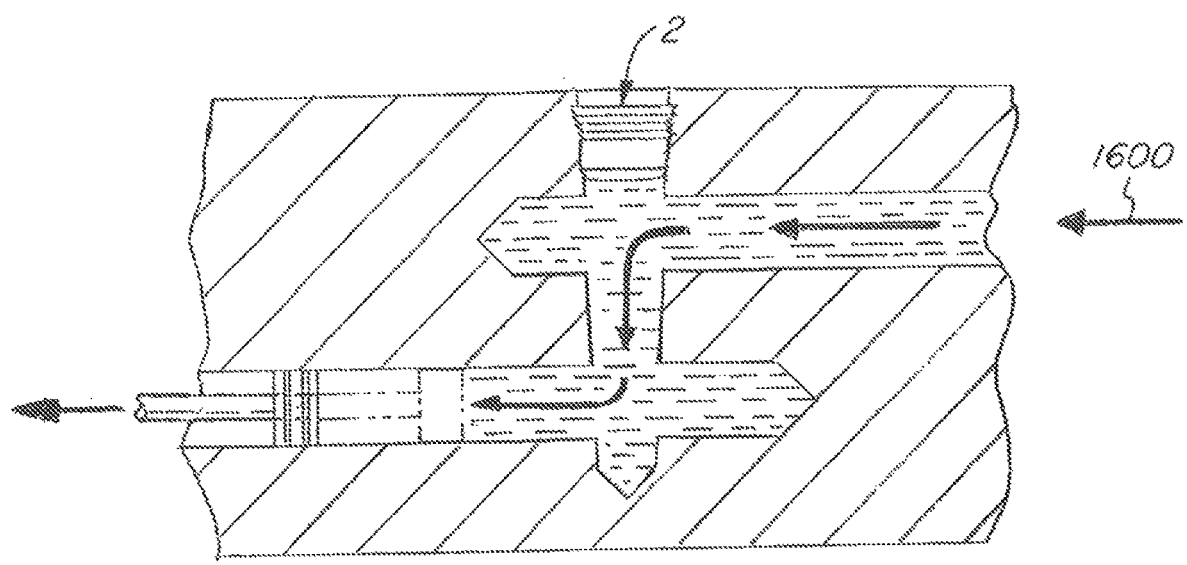

In most cases, the plug 2 is made from aluminum and the block 9000 from steel. In one embodiment, pounds/mm plug diameter is in the range of 75-200 pounds/mm diameter, or more particularly 100-125 pounds/mm diameter. The installation force/spring contact force may be in the range of 175-375 or more particularly 225-300 with the spring force measured at first contact of the end 108 during installation. The installation force/final spring force is in the range of 50-125 or more particularly 65-85 with the final spring force being when the spring is fully compressed as shown in FIG. 15. Particularly, the contact travel in the 7 mm plug is approximately 0.05357 inches such that the contact travel is about 42% of the overall travel 1500. This contact travel 1400 may be in the range of 30-50% of the overall travel 1500. FIG. 16 shows the plug 2 sealing the hole with fluid 1600 in the passageways.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A tool for installing a plug which seals a hole, the tool comprising:
a body with a proximal end and a distal end;
a pin located in an interior channel aligned with a central axis of the body, the interior channel extending to the distal end;
said pin in an extended position protruding from the distal end, said pin configured to retract within the interior channel with resistance from a spring;
an end section of the tool located at the distal end has an inward taper in a direction from the proximal towards the distal end;
an inner diameter located where said interior channel and distal end meet, the inner diameter greater than a diameter of said pin such that a space exists at the distal end in said interior channel between said pin, said distal end and an outwards facing face of a stop nut, the stop nut in the interior channel such that the outwards facing face is spaced axially from said distal end.

2. The tool of claim 1 wherein said interior channel is threaded adjacent the pin where the space is defined.

3. The tool of claim 1 wherein said pin has a T shaped cross section.

4. The tool of claim 1 wherein the stop nut is threaded into the interior channel.

5. The tool of claim 1 wherein said stop nut positioned such that the pin is between the stop nut and the spring and at least part of the pin extends through a hole in the stop nut.

6. The tool of claim 1 further comprising a stop threaded into the interior channel such that the spring and pin are between the stop and the stop nut.

7. The tool of claim 1 wherein the interior channel has two threaded portions, a first portion located closer to the proximal end and having a diameter larger than a second portion located closer to the distal end.

8. The tool of claim 7 further comprising said stop nut installed in said second portion of said interior channel, said stop nut positioned such that the pin is between the stop nut and the spring and at least part of the pin extends through a hole in the stop nut.

9. The tool of claim 1 wherein the interior channel has two threaded portions, a first portion located closer to the proximal end and having a diameter larger than a second portion located closer to the distal end.

10. The tool of claim 9 further comprising a stop nut installed in said second portion of said interior channel, said stop nut positioned such that the pin is between the stop nut and the spring and at least part of the pin extends through a hole in the stop nut.

11. A tool for installing a plug which seals a hole, the tool comprising:
a body with a proximal end and a distal end;
an end section of the tool located at the distal end has an inward taper in a direction from the proximal towards the distal end;
a pin located in an interior channel aligned with a central axis of the body, the interior channel extending to the distal end and a distal end of the pin configured to move along a central axis of the tool such that in an extended position, the distal end of the pin extends beyond the distal end and said pin retracts relative to the end section wherein extension and retraction of said pin is biased by a spring;

wherein the interior channel has two threaded portions, a first portion located closer to the proximal end and having a diameter larger than a second portion located closer to the distal end.

12. The tool of claim 11 wherein said pin has a T shaped cross section.

13. The tool of claim 11 further comprising:
a stop nut installed in said interior channel, said stop nut positioned such that the pin is between the stop nut and the spring and at least part of the pin extends through a hole in the stop nut.

14. The tool of claim 13 wherein said stop nut is installed in the interior channel at a depth spaced away from the distal end of the tool.

15. The tool of claim 13 further comprising a stop threaded into the interior channel such that the spring and pin are between the stop and the stop nut.

16. The tool of claim 13 wherein said stop nut is installed in the interior channel at a depth spaced axially away from the distal end of the tool to define an axial space between the stop nut and the distal end.

17. A tool for installing a plug which seals a hole, the tool comprising:
a body with a proximal end and a distal end;
an end section of the tool located at the distal end has an inward taper in a direction from the proximal towards the distal end;
a pin located in an interior channel aligned with a central axis of the body,
the interior channel extending to the distal end and a distal end of the pin configured to move along a central axis of the tool such that in an extended position, the distal end of the pin extends beyond the distal end and said pin retracts relative to the end section wherein extension and retraction of said pin is biased by a spring;
a stop nut installed in said interior channel, said stop nut positioned such that the pin is between the stop nut and the spring and at least part of the pin extends through a hole in the stop nut;
a stop threaded into the interior channel such that the spring and pin are between the stop and the stop nut.

\* \* \* \* \*